(12) United States Patent
Mather et al.

(10) Patent No.: US 8,651,550 B2
(45) Date of Patent: Feb. 18, 2014

(54) STOWABLE SEAT ARRANGEMENT FOR A VEHICLE

(75) Inventors: Carl Mather, Lake Orion, MI (US); Todd R. Teasdale, Canton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 182 days.

(21) Appl. No.: 13/324,638

(22) Filed: Dec. 13, 2011

(65) Prior Publication Data

US 2013/0147227 A1    Jun. 13, 2013

(51) Int. Cl.
*B60N 2/30* (2006.01)

(52) U.S. Cl.
USPC .................. 296/65.09; 296/37.14; 296/66

(58) Field of Classification Search
USPC .......... 296/37.14, 37.15, 65.01, 65.09, 65.13, 296/65.16, 66, 69; 297/15
See application file for complete search history.

(56) References Cited

U.S. PATENT DOCUMENTS

| | | | |
|---|---|---|---|
| 841,135 A * | 1/1907 | Finch .............................. | 297/15 |
| 1,887,947 A * | 11/1932 | Savale ............................ | 297/15 |
| 1,947,980 A * | 2/1934 | Feyrer ............................ | 296/66 |
| 5,195,795 A * | 3/1993 | Cannera et al. ............. | 296/65.09 |
| 5,839,773 A * | 11/1998 | Ban et al. ..................... | 296/65.09 |
| 6,279,982 B1 * | 8/2001 | Nishimura et al. ......... | 296/65.09 |
| 6,869,138 B2 | 3/2005 | Rhodes et al. | |
| 6,955,386 B2 | 10/2005 | Rhodes et al. | |
| 6,962,384 B2 | 11/2005 | Rhodes et al. | |
| 7,011,352 B2 * | 3/2006 | Matsuoka et al. .......... | 296/37.14 |
| 7,014,260 B2 * | 3/2006 | Moriyama et al. ............... | 297/15 |
| 7,066,519 B2 | 6/2006 | Rhodes et al. | |
| 7,066,539 B2 * | 6/2006 | Hatta et al. ................ | 297/344.14 |
| 7,077,451 B2 | 7/2006 | Rhodes et al. | |
| 7,152,900 B2 * | 12/2006 | Trombley et al. .......... | 296/65.09 |
| 7,216,915 B2 * | 5/2007 | Kammerer et al. ........ | 296/65.09 |

(Continued)

FOREIGN PATENT DOCUMENTS

| | | |
|---|---|---|
| DE | 2843667 A1 | 4/1980 |
| DE | 102008031015 A1 | 12/2009 |

(Continued)

OTHER PUBLICATIONS

International Search Report dated Mar. 11, 2013 for International Application No. PCT/US2012/068130, International Filing Date Dec. 6, 2012.

(Continued)

*Primary Examiner* — Glenn Dayoan
*Assistant Examiner* — Paul Chenevert
(74) *Attorney, Agent, or Firm* — Ralph E. Smith (57) ABSTRACT

A stowable seat arrangement can include a seat having a seat back pivotably coupled to a seat bottom. A pair of front and rear legs can be pivotably coupled to the seat bottom. A first floor panel can be fixed to the pair of front legs. An access panel can be pivotably coupled to the vehicle and the front legs. The seat can selectively articulate from a deployed to a stowed position where the seat is adapted to be received in a stowage recess of the vehicle. The articulation of the seat can automatically open the access panel to provide access to the recess and then close the access panel upon the seat being in the stowed position. The first floor panel can automatically move to a substantially horizontal position relative to a vehicle floor to provide a flat load floor configuration when the seat is in the stowed position.

20 Claims, 13 Drawing Sheets

(56) References Cited

U.S. PATENT DOCUMENTS

| | | |
|---|---|---|
| 7,229,117 B2 * | 6/2007 | Okuda et al. ............... 296/64 |
| 7,377,571 B2 | 5/2008 | Ewers et al. |
| 7,686,367 B2 * | 3/2010 | Neale ...................... 296/64 |
| 8,485,583 B2 * | 7/2013 | Mather et al. ............ 296/65.09 |
| 2004/0075292 A1 * | 4/2004 | Rausch et al. ............ 296/65.03 |
| 2006/0170235 A1 * | 8/2006 | Oilar et al. ............... 296/37.14 |
| 2007/0210601 A1 * | 9/2007 | Phillips et al. ............ 296/37.14 |
| 2008/0224524 A1 | 9/2008 | Mather et al. |
| 2010/0026032 A1 | 2/2010 | Leopold |

FOREIGN PATENT DOCUMENTS

| | | | |
|---|---|---|---|
| FR | 2908700 A1 | 5/2008 | |
| JP | 58085730 A * | 5/1983 | ............ B60N 1/06 |
| WO | WO 03008230 A1 * | 1/2003 | ............ B60N 2/44 |

OTHER PUBLICATIONS

Written Opinion dated Mar. 11, 2013 for International Application No. PCT/US2012/068130, International Filing Date Dec. 6, 2012.

* cited by examiner

STOWABLE SEAT ARRANGEMENT FOR A VEHICLE

FIELD

The present disclosure relates generally to seating arrangements for a vehicle and, more particularly, to a stowable seating arrangement for a vehicle.

BACKGROUND

In motor vehicles such as vans, mini-vans and sport utility vehicles, it is desirable that passenger seating arrangements be optionally stowable on-board the vehicle when not in use to provide additional or improved storage capacity for carrying cargo. One potential solution to this desire for additional storage capacity is a seat assembly that is capable of being stowed to provide a flat load floor. One potential drawback of the current stowable seat assemblies is the complexity of the arrangements utilized to facilitate stowage of the seats. Another potential drawback of the current stowable seat assemblies is a need for a user to open an access door to a stowage tub independently from initiating stowing of the seat assembly, and then to close the access door in another independent action after the seat assembly has been stowed.

Thus, while stowable seat assemblies have generally worked for their intended purpose, there remains a need for continuous improvement in the relevant art.

SUMMARY

In one form, a stowable seat arrangement for a vehicle having a floor is provided in accordance with the teachings of the present disclosure. The stowable seat arrangement can include a seat, a pair of front and rear legs, a first floor panel and an access panel assembly. The seat can have a seat back pivotably coupled to a seat bottom. The pair of front legs and the pair of rear legs can each be pivotably coupled to the seat bottom. The first floor panel can be fixed to the pair of front legs and movable therewith. The access panel assembly can be pivotably coupled to the vehicle and the pair of front legs. The seat can be configured to selectively articulate from a deployed position to a stowed position where the seat is adapted to be received in a stowage recess of the vehicle. The articulation of the seat from the deployed position to the stowed position can be configured to automatically open the access panel assembly to provide access to the stowage recess and then close the access panel assembly upon the seat being in the stowed position. The first floor panel can be positioned substantially vertical to the vehicle floor when the seat is in the deployed position and can be configured to automatically move to a substantially horizontal position relative to the vehicle floor to provide a flat vehicle load floor configuration when the seat is in the stowed position.

In another form, a stowable seat arrangement for a vehicle having a floor is provided in accordance with the teachings of the present disclosure. The stowable seat arrangement can include a seat, a pair of seat tracks, a pair of front and rear legs, rollers, a pair of floor tracks, a first floor panel and an access panel assembly. The seat can have a seat back pivotably coupled to a seat bottom. The pair of seat tracks can each have an inner track coupled to the seat bottom and an outer track selectively moveable relative to the inner track. The pair of front legs can be pivotably coupled to the outer tracks, and the pair of rear legs can each have a first leg member coupled to the outer tracks and a second leg member releasably pivotably coupled at one end to the first leg member and pivotably coupled to the vehicle at a second end. The rollers can be operatively associated with the first leg members and the pair of floor tracks can be coupled to the vehicle floor. The first floor panel can be fixed to the pair of front legs and movable therewith, and the access panel assembly can be pivotably coupled to the vehicle at a first end and to the pair of front legs and a second opposite end. The seat can be configured to selectively articulate from a deployed position to a stowed position where the seat is adapted to be received in a stowage recess of the vehicle. The rollers can be configured to be received in the floor tracks and guided thereby during articulation of the seat from the deployed position to the stowed position. The articulation of the seat from the deployed position to the stowed position can be configured to automatically open the access panel assembly to provide access to the stowage recess and then close the access panel assembly upon the seat being in the stowed position. The first floor panel can be positioned at an angle relative to the vehicle floor when the seat is in the deployed position and configured to automatically move to a substantially horizontal position relative to the vehicle floor to provide a flat vehicle load floor configuration along with the first floor panel when the seat is in the stowed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
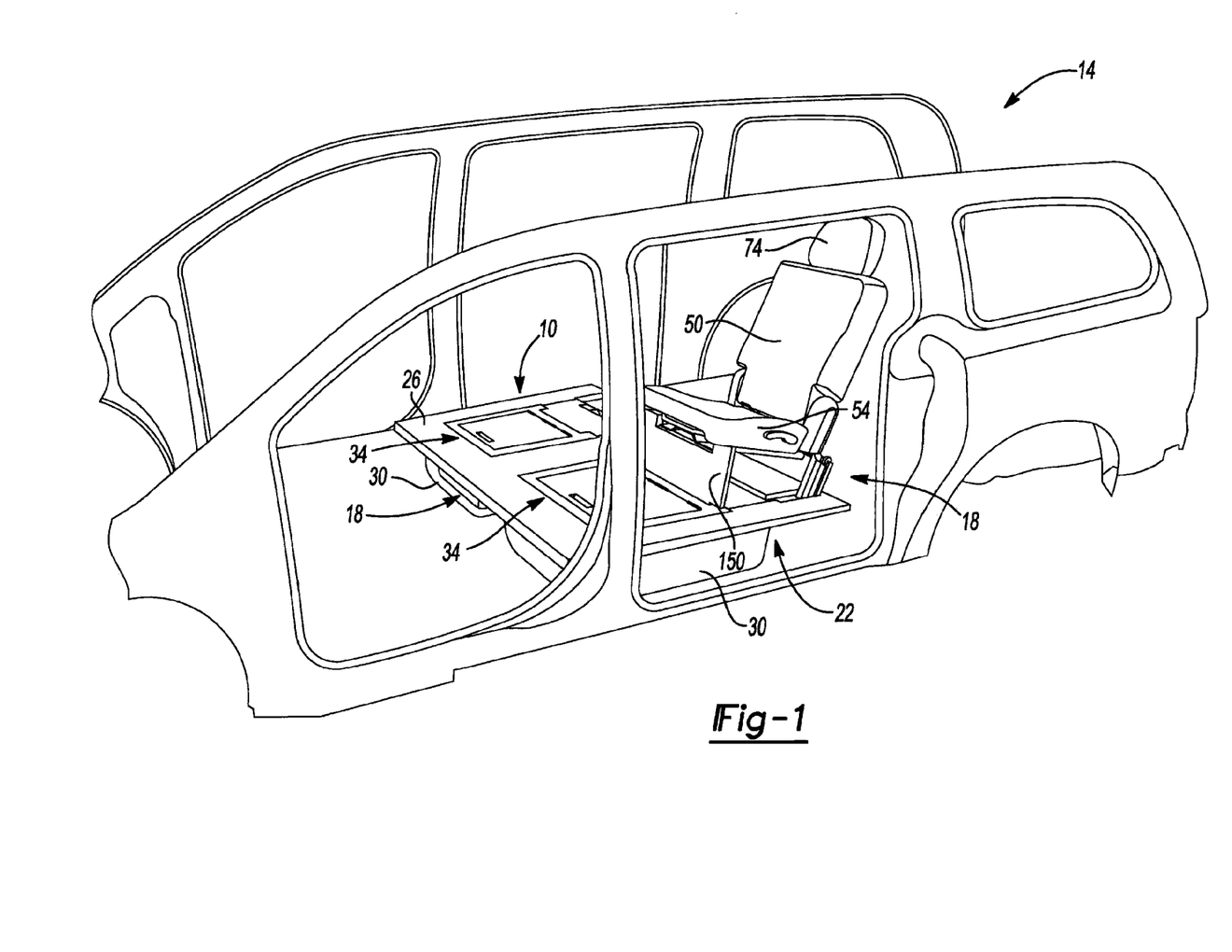
FIG. 1 is a perspective view of a partial exemplary vehicle structure showing an exemplary stowable seating arrangement according to the principles of the present disclosure.

With initial reference to FIG. 1, a stowable seating arrangement 10 is provided for a motor vehicle 14 in accordance with the present teachings and can include outboard seat assemblies 18. As shown, the seating arrangement 10 may be for a second row of seating 22 for the vehicle 14 and can include outboard seat assemblies 18 in a side-by-side spaced apart configuration. Vehicle 14 can generally include a floor 26, first and third rows of seating (not shown), a stowage recess or tub 30 configured to receive each stowable seat assembly 18, and stowage recess covers or access panel assemblies 34 operatively associated with each seat assembly 18 for covering the recesses 30. It should be appreciated that while the following discussion will continue with reference to one of the outboard seat assemblies 18, the discussion is applicable to both the passenger and driver side outboard seat assemblies 18, as well as for center seat assemblies positioned between the outboard assemblies and/or third row seating arrangements.

Figure 4:
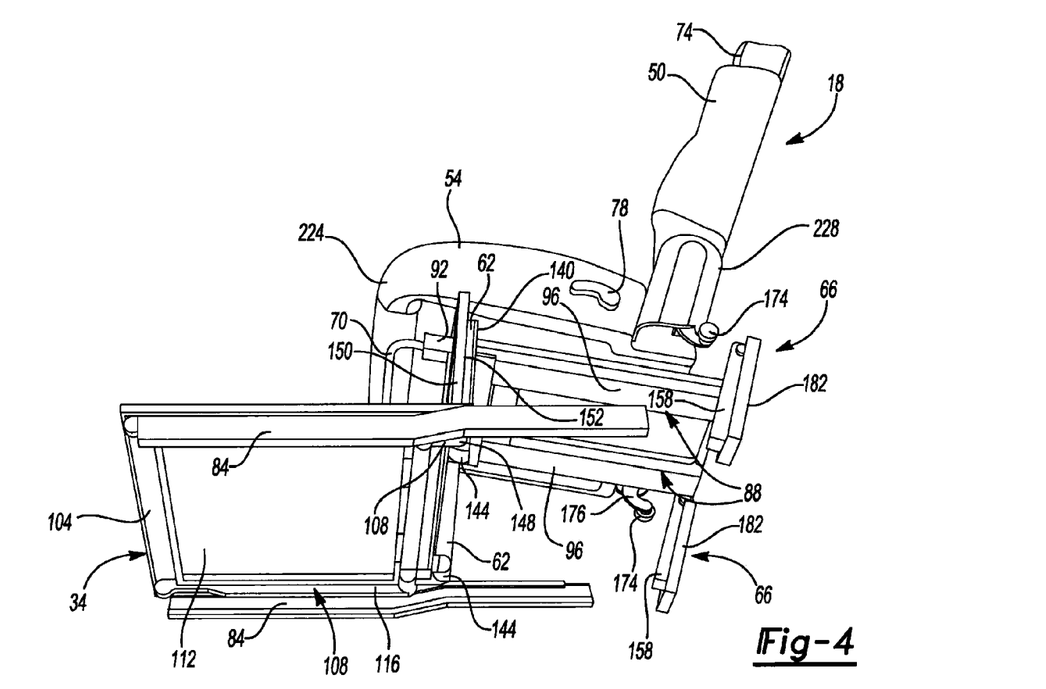
FIG. 4 is a bottom perspective view of the stowable seat depicting fore-aft adjustment of the seat according to the principles of the present disclosure.

As will be discussed in greater detail below, each seat assembly 18 can be individually stowed in one of the stowage recesses 30 to provide a flat load floor configuration 38, as show for example in FIG. 2 with respect to the passenger side seat assembly 18 and FIG. 15A with respect to both the driver and passenger side seat assemblies 18. In addition to being stowable, the seat assembly 18 can also include fore-aft adjustment, as generally shown in FIG. 4, as well as automatic opening and closing of the stowage recess access panel assembly 34 in connection with deploying and stowing the seat assembly 18, respectively. Each of these features will also be discussed in greater detail below.

With additional reference to FIGS. 2-15B, the seat assembly 18 and stowage recess access panel assembly 34 will now be discussed in greater detail. As discussed above, several features of seat assembly 18 will be discussed below in connection with the driver side outboard seat assembly 18 shown in the various figures. In this regard, when duplicate components are discussed, such as a pair of front legs and an associated pair of seat tracks, it should be appreciated that an inboard side 42 of the seat assembly 18 opposite an outboard side 46 can have the same structure and operation with respect to such components and/or features and thus the inboard side 42 will not be separately discussed in detail herein.

In one exemplary configuration, seat assembly 18 can include a seat back 50, a seat bottom 54, a seat track assembly 58, a pair of front legs 62 and a pair of rear legs 66 each operatively associated with the seat track assembly 58, and an adjustment bar 70 operatively associated with the seat track assembly 58. Seat assembly 18 can further include a head rest 74, optional arm rests (not shown) and a release lever 78 configured to facilitate folding or collapsing seat back 50 relative to seat bottom 54. A pair of floor tracks 84 can be coupled to the vehicle floor 26 proximate lateral sides of the stowage recess 30 and are configured to facilitate deploying and stowing the seat assembly 18, as shown for example in FIGS. 4A and 7 and will be discussed in greater detail below. It should be appreciated that in several views of the drawings, such as FIG. 4A, the stowage recess 30, vehicle floor 26 and surrounding structure of the vehicle are not shown in the bottom perspective views for clarity purposes.

With particular reference to FIGS. 2-5, the seat track assembly 58 can include a pair of tracks 88 each having an inner track 92 fixed to seat bottom 54 and an outer track 96 slidably coupled to inner track 92, as shown for example in FIG. 4. The adjustment bar 70 can be coupled to the seat track assembly 58 and can be configured to facilitate releasing and locking the inner track 92 relative to the outer track 96 with use of any suitable latching mechanism to provide fore-aft adjustment of the seat assembly 18 relative to the vehicle floor 26, as also shown in FIG. 4.

Figure 2:
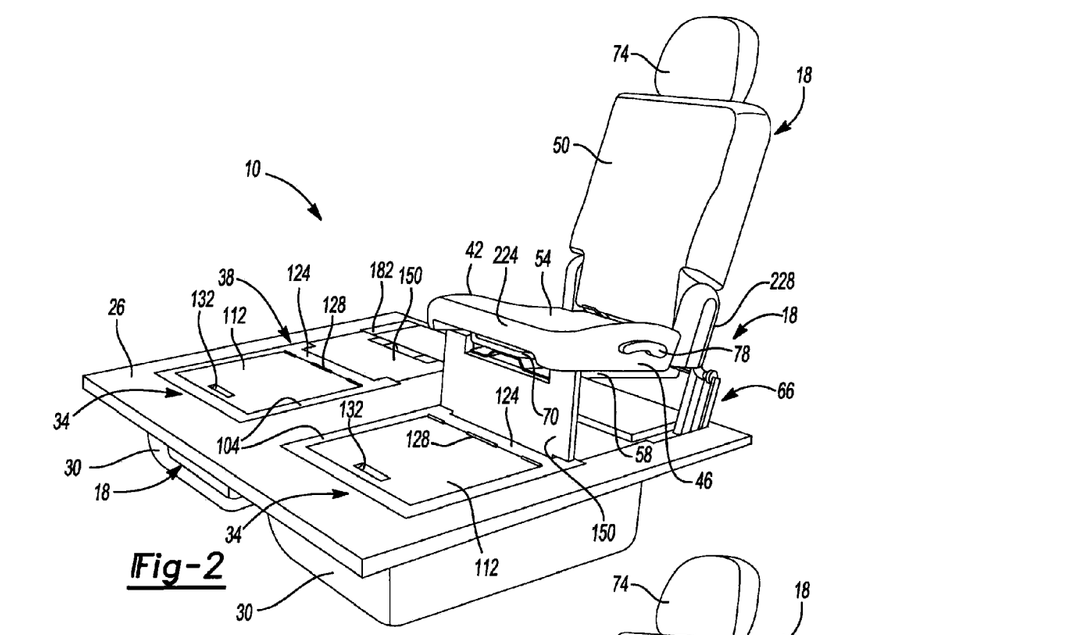
FIG. 2 is a perspective view of one of the stowable seats of the stowable seating arrangement of FIG. 1 along with a schematic representation of a floor assembly of the vehicle according to the principles of the present disclosure.
Figure 3:
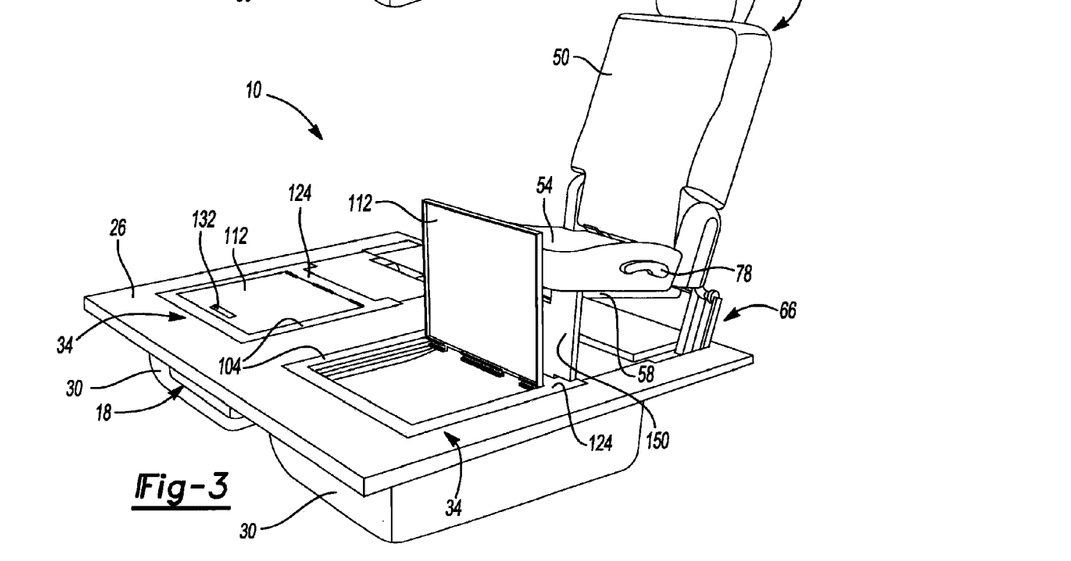
FIG. 3 is a perspective view of the seating arrangement of FIG. 2 illustrating an inner access panel of a stowage recess access panel assembly in an open position according to the principles of the present disclosure.

The access panel assembly 34 can include an outer access panel 104, a frame structure 108 and an inner access panel 112 pivotably coupled to the outer access panel 104, as shown for example in FIGS. 2-4. The frame structure 108 can include a pair of longitudinal members 116 extending longitudinally along lateral sides of the outer access panel 104, as shown for example in FIG. 7B. The outer access panel 104 can be pivotably coupled 118 at a first or forward end 120 of the members 116 to the vehicle floor 26 and/or floor tracks 84, as shown for example in FIG. 4 with reference to FIGS. 7A and 7B. The inner access panel 112 can be pivotably coupled to a rearward area 124 of the outer access panel 104 via a hinge or hinges 128 and can be opened and closed relative to or independent of outer access panel 104. In one exemplary configuration, the outer access panel 104 surrounds or encloses the inner access panel 112, as shown for example in FIGS. 2 and 3. The inner access panel 112 can also include a handle or undercut 132 to facilitate opening or pivoting the inner access panel 112 relative to the outer access panel 104.

Figure 7A:
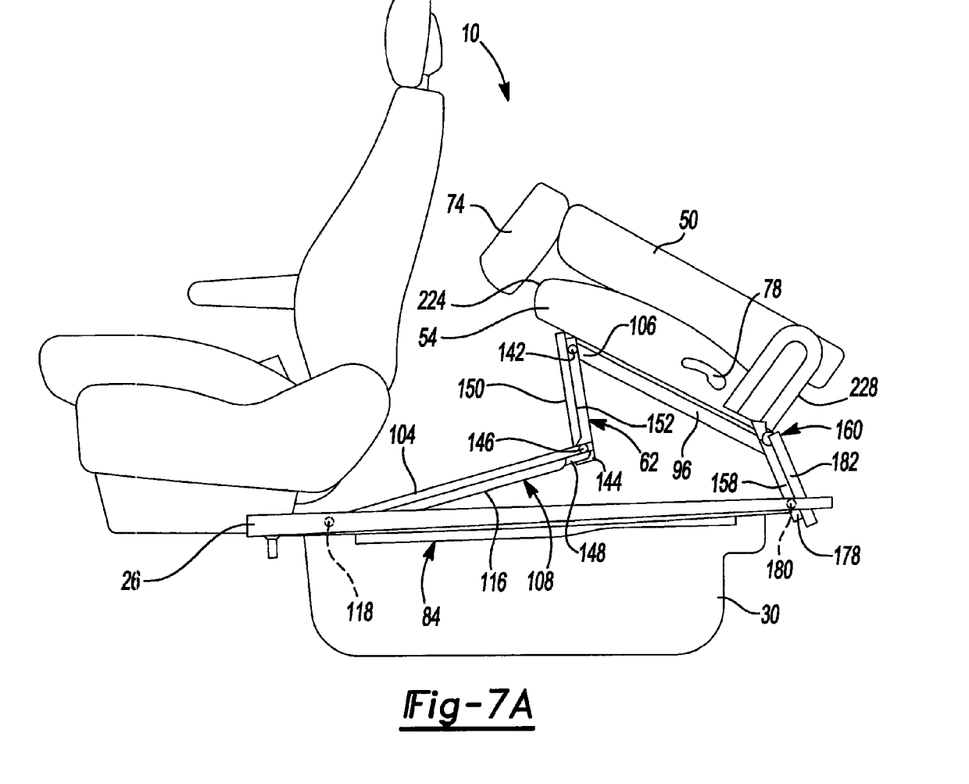
FIG. 7A is a side view illustrating the front legs of the stowable seat released from a deployed position according to the principles of the present disclosure.
Figure 7B:
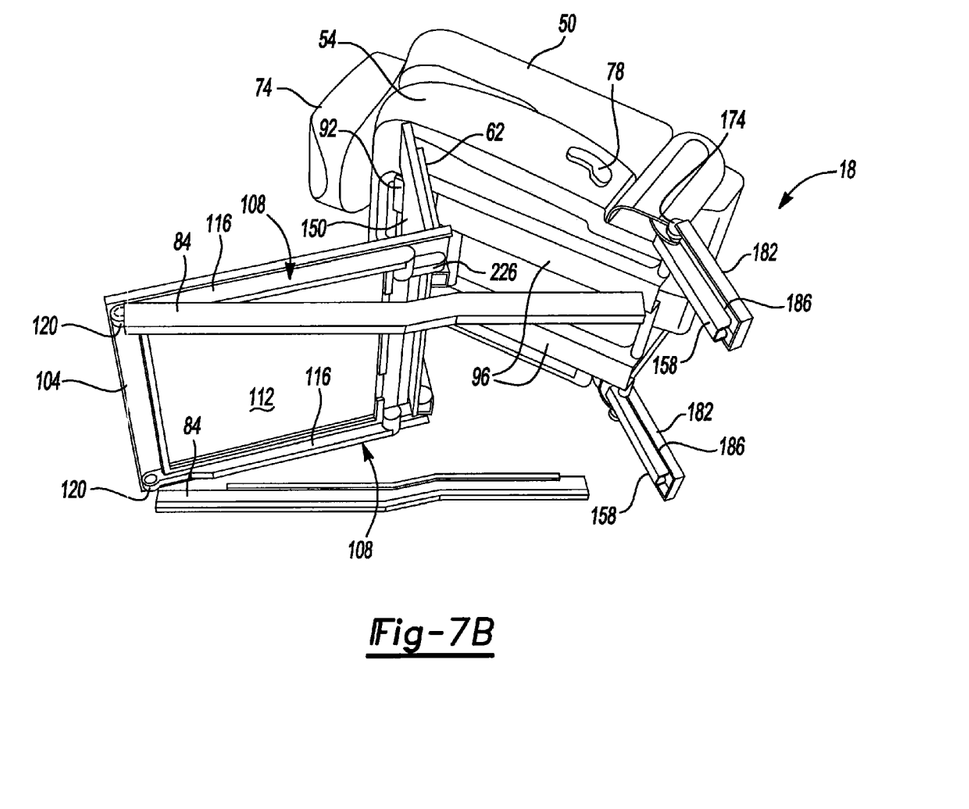
FIG. 7B is a bottom perspective view of the stowable seat of FIG. 7A according to the principles of the present disclosure.

The pair of front legs 62 can each include a first or upper end 140 pivotably coupled 142 to a first or forward end 106 of the outer tracks 96 and a second or lower end 144 pivotably coupled 146 to a second or rearward end 148 of the frame structure 108, as shown in FIG. 4 with reference to FIG. 7A. A first floor panel 150 can be fixed to a forward side 152 of the front legs 62, as shown for example in FIGS. 4 and 5. The first floor panel 150 can be in a vertical or substantially vertical position relative to floor 26 when seat assembly 18 is in the deployed position shown for example in FIGS. 3 and 5. As will be discussed in greater detail below, floor panel 150 can automatically move with front legs 62 during stowage of seat assembly 18 so as to automatically form part of the flat load floor configuration 38 upon stowing of seat assembly 18, as shown for example in FIGS. 14A and 15A.

Figure 6:
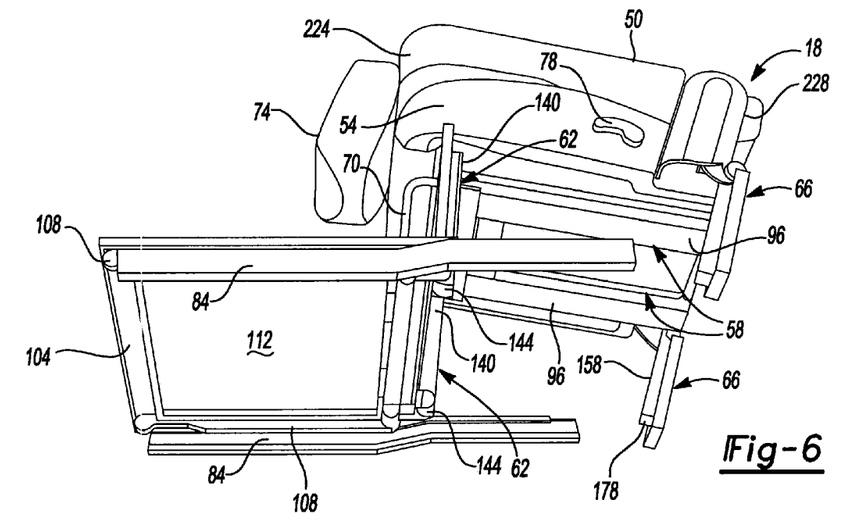
FIG. 6 is a partial bottom perspective view of the stowable seat of FIG. 5 according to the principles of the present disclosure.
Figure 6A:
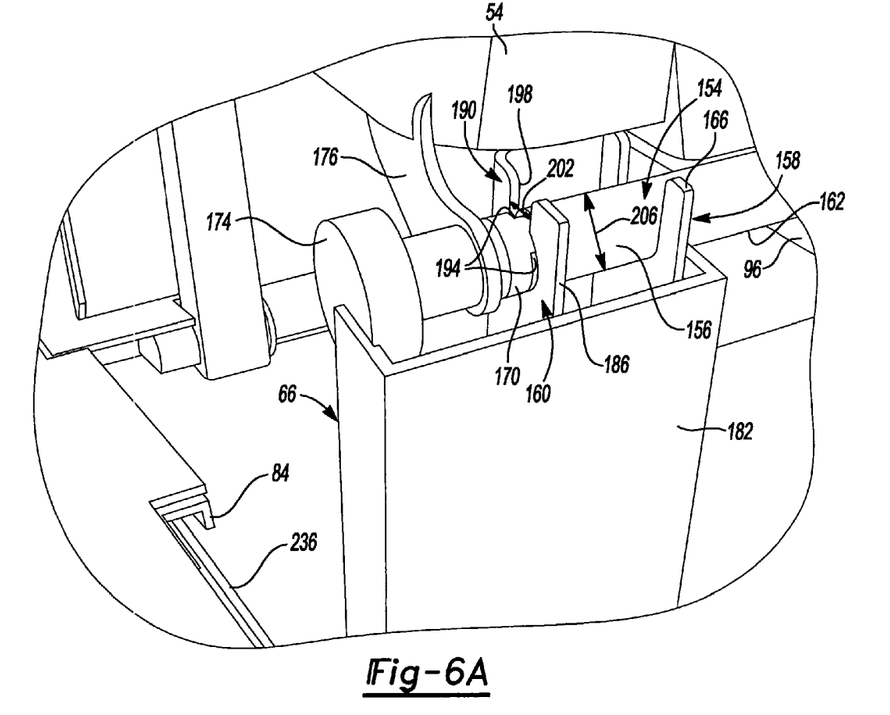
FIGS. 6A and 6B are partial views of a rear leg arrangement of the stowable seat according to the principles of the present disclosure.
Figure 6B:
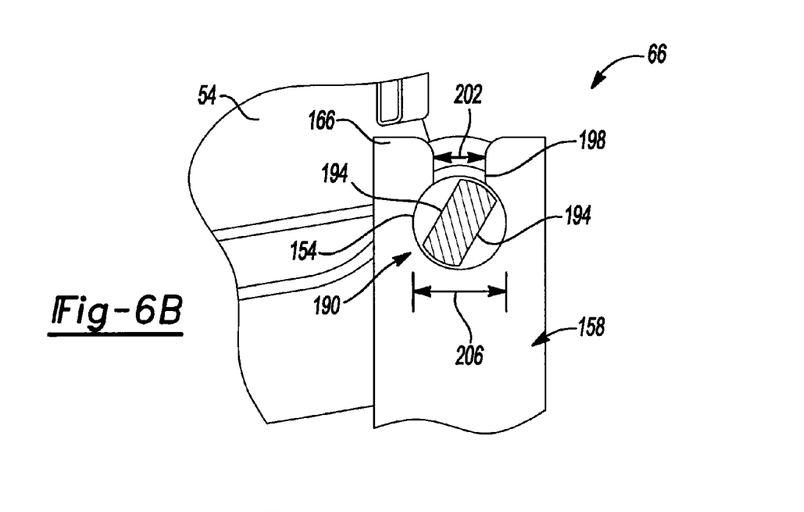

With particular reference to FIGS. 6-6B, the pair of rear legs 66 can each include a first leg member 154 coupled to the seat bottom 54 and a second leg member 158 pivotably releasably coupled 160 (FIG. 6A) to the first leg member 154. In one exemplary configuration, the first leg member 154 can include a shaft 156 coupled to the outer track 96 at an end 162 and can be pivotably releasably coupled to a first or upper end 166 of the second leg member 158, as shown for example in FIG. 6A. An opposite end 170 of first leg member 154 can include a roller 174 configured to be received in floor tracks 84 during the stowage operation, as will be discussed in greater detail below. Roller 174 can additionally or alternatively be coupled to seat bottom 54 via arm 176. A second or lower end 178 of second leg member 158 can be pivotably coupled 180 to the vehicle floor 26, as shown for example in FIG. 7A. A pair of second floor panels 182 can be fixed to a rearward side 186 of the second leg members 158 and can automatically form part of the flat load floor configuration 38 upon stowage of the seat assembly 18, as shown in FIGS. 14A-15B and will be discussed in greater detail below.

In one exemplary configuration, the rear legs 66 can each include a retention arrangement 190 configured to selectively retain the first leg member 154 pivotably coupled to the second leg member 158 when seat assembly 18 is in a deployed configuration and during a portion of the stowage operation. With particular reference to FIGS. 6A-6B, the retention arrangement 190 can include a pair of slots 194 formed in an outer surface of first leg member 154 and a channel 198 having a width 202 greater than a width between slots 194, but less than an outer diameter or width 206 of first leg member 154. In operation, slots 194 can be positioned in first leg member 154 such that they can be received through channel 198 during assembly of seat assembly 18 and misaligned relative to channel 198 when seat assembly 18 is in the deployed configuration shown, for example, in FIGS. 6A and 6B. In this configuration, first leg member 154 is captured in second leg member 158 while being pivotably moveable relative thereto.

As will be discussed in greater detail below, the second leg members 158 can align with the floor tracks 84 during the stowage operation, as shown for example in FIG. 10B, at which time the second leg member 158 has rotated relative to the first leg member 154 to align slots 194 with channel 198. In this configuration, first leg member 154 can be slidably released from the second leg member 158 and advance forward in the direction of arrow A with roller 174 engaging floor track 84, as shown for example in FIGS. 10C and 10D.

Figure 5:
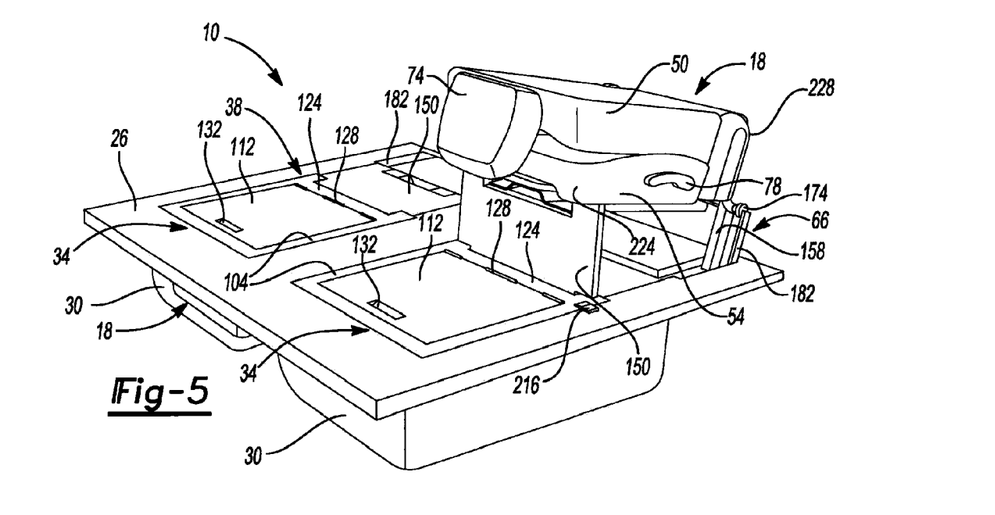
FIG. 5 is a perspective view of the stowable seat of FIG. 2 with a seat back in a collapsed position and a head rest in a stowed position according to the principles of the present disclosure.

With reference to FIGS. 5-15B, operation and stowage of the seat assembly 18 will now be discussed in greater detail. To stow the seat assembly 18, seat back 50 can be pivoted to a collapsed or stowed position substantially parallel to seat bottom 54 by actuation of release lever 78. Actuation of release lever 78 can also fold or collapse head rest 74 to a stowed position, as also shown in FIG. 5. A release mechanism, such as the exemplary release mechanism 216 shown in FIG. 5, can be actuated to release a forward end 224 of seat assembly 18 from the floor 26. In one exemplary configuration, release mechanism 216 can releasably couple the outer access panel 104 to the adjacent vehicle floor 26. In an alternative exemplary configuration, the release mechanism 216 can releasably couple a rearward end 226 (FIG. 7B) of members 116 or lower end 144 of front legs 62 to floor tracks 84.

Figure 8:
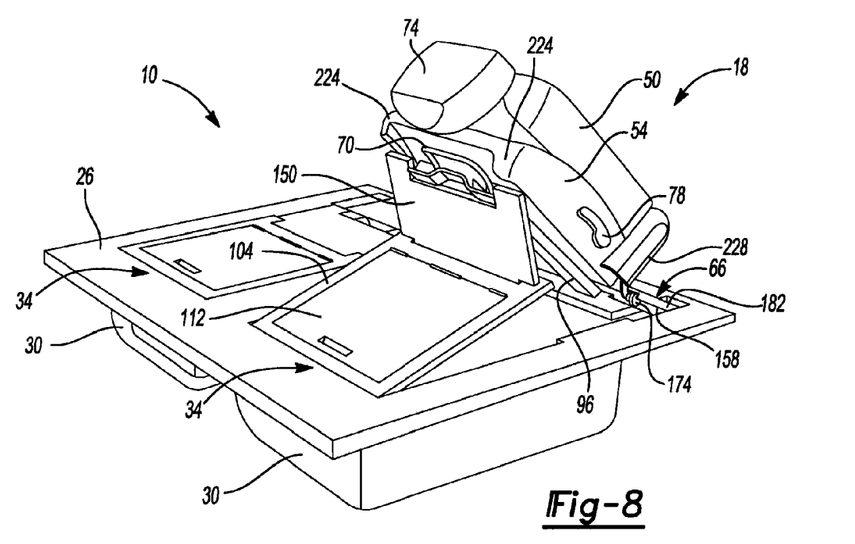
FIGS. 8 and 9 are perspective views depicting the stowable seat being moved/articulated toward a stowed position according to the principles of the present disclosure.
Figure 9:
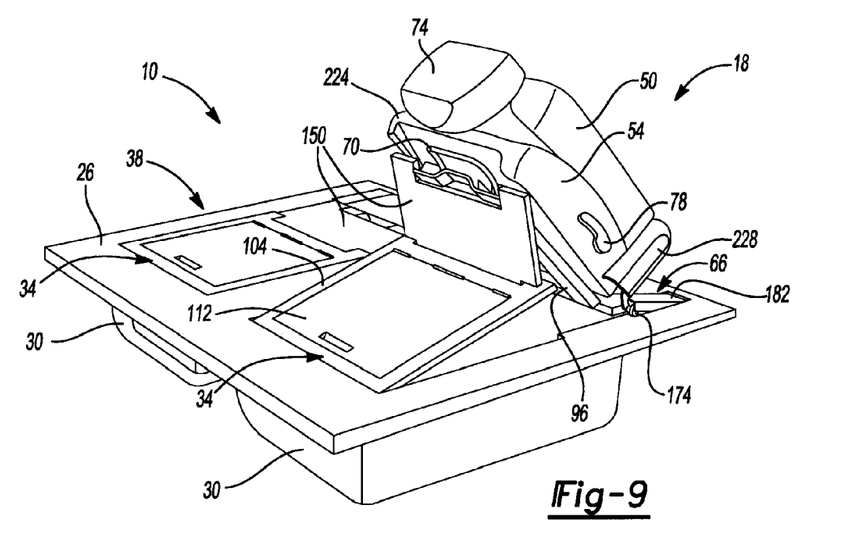

Upon actuation of release mechanism 216, the forward end 224 of seat assembly 18 can be lifted or raised relative to floor 26, as shown for example in FIG. 7A. Upon such action, the access panel assembly 34 can automatically raise from floor 26 to provide access to stowage recess 30. In this action, access panel assembly can pivot about the pivotable connection 118 at the forward end 120 of longitudinal members 116 and the pivotable connection 146 at the rearward end 148 of members 116, as also shown in FIG. 7A. In a similar manner, front legs 62 can pivot relative to seat bottom 54 about pivotable connection 142 and rear legs 66 can pivot relative to the seat bottom 54 and floor 26 about pivotable connections 160 and 180, respectively, as also shown in FIG. 8 with reference to FIG. 7A.

Seat assembly 18 can be articulated such that the forward end 224 continues to be raised relative to the floor 26, as shown for example in FIGS. 7A-9. Continued raising of the forward end 224 of seat assembly 18 can draw a rearward end 228 of the seat assembly 18 forward and can pivot the rear legs 66 about connections 160, 180 such that the second leg member 158 approaches being parallel with the vehicle floor 26, as shown for example in FIG. 9.

Figure 10A:
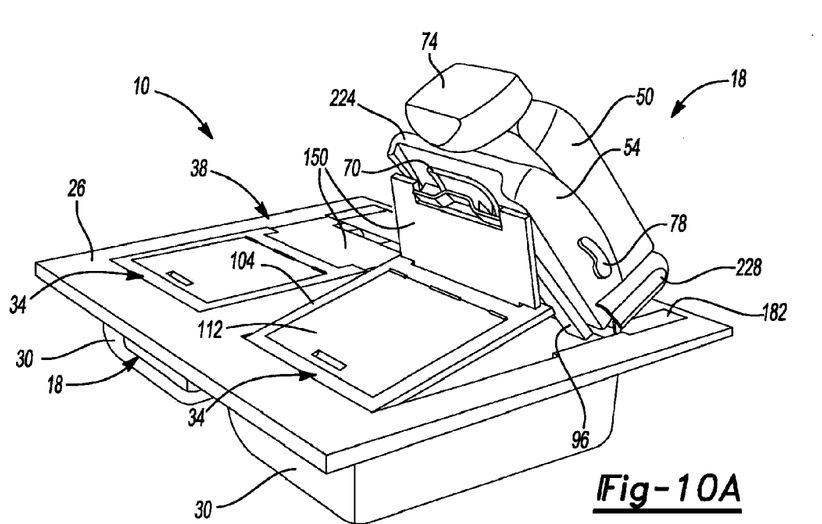
FIGS. 10A and 10B are top and bottom perspective views illustrating a portion of the rear legs in alignment with a track arrangement according to the principles of the present disclosure.
Figure 10B:
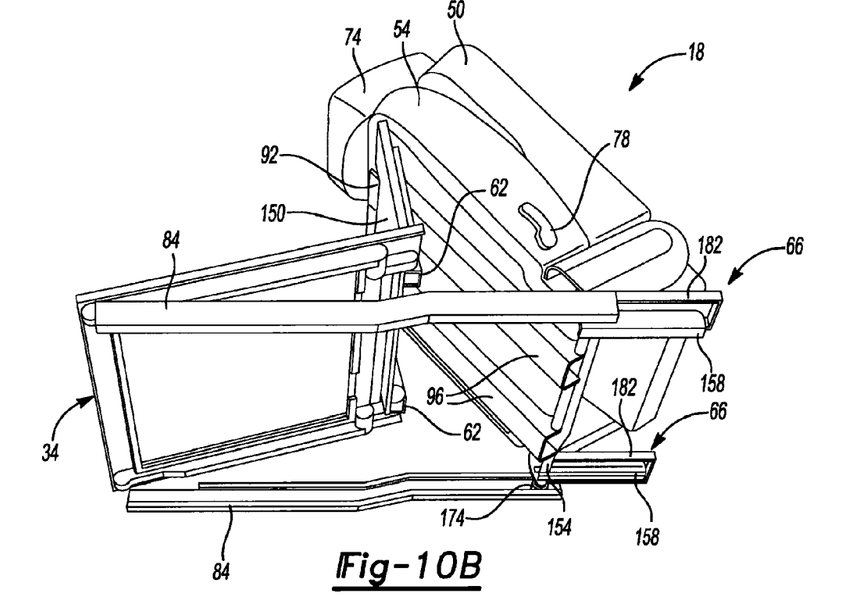

Upon articulating seat assembly 18 to a position where second leg members 158 of rear legs 66 are parallel or substantially parallel to the vehicle floor 26 and/or floor tracks 84, the second floor panels 182 can be flush or substantially flush with vehicle floor 26 thereby covering the second leg members 158 and forming part of the flat load floor configuration 38, as shown in FIGS. 10A-10B. In this position, the second leg members 158 can be parallel or substantially parallel to the floor tracks 84 and the slots 194 of the first leg members 154 can align with the channel 198 in the second leg members, as discussed above and shown in FIGS. 10C-10D. Continued articulation of the seat assembly 18 such that the forward end 224 is raised and urged rearward can advance the rearward end 228 forward in the direction of arrow A (FIG. 10C) such that first leg member 154 advances out of the second leg member 158.

Figure 10C:
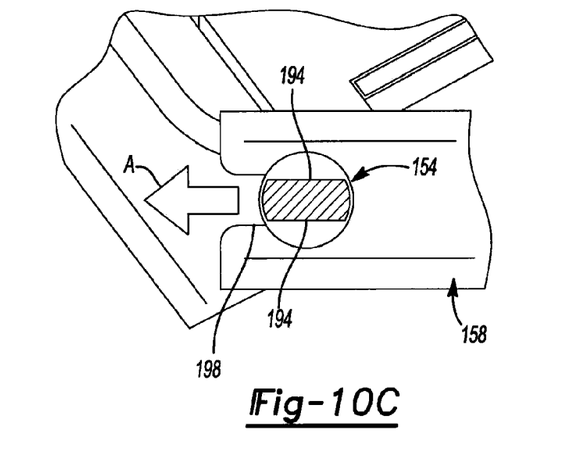
FIG. 10C is a partial enlarged view of a rear leg roller configuration according to the principles of the present disclosure.
Figure 10D:
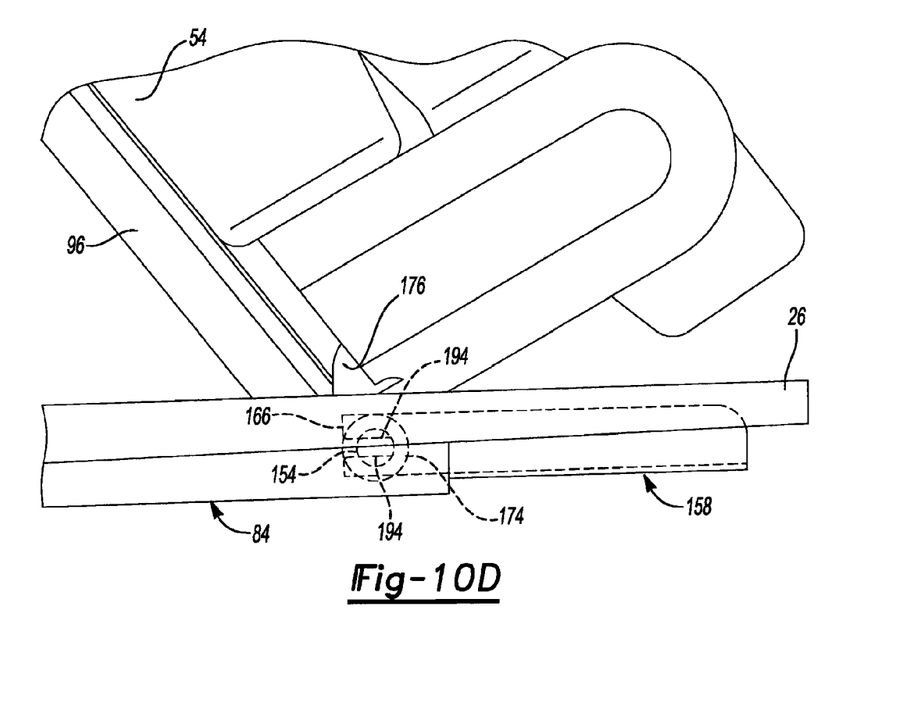
FIG. 10D is an enlarged side view illustrating a portion of the rear leg and roller configuration relative to the track arrangement according to the principles of the present disclosure.
Figure 11:
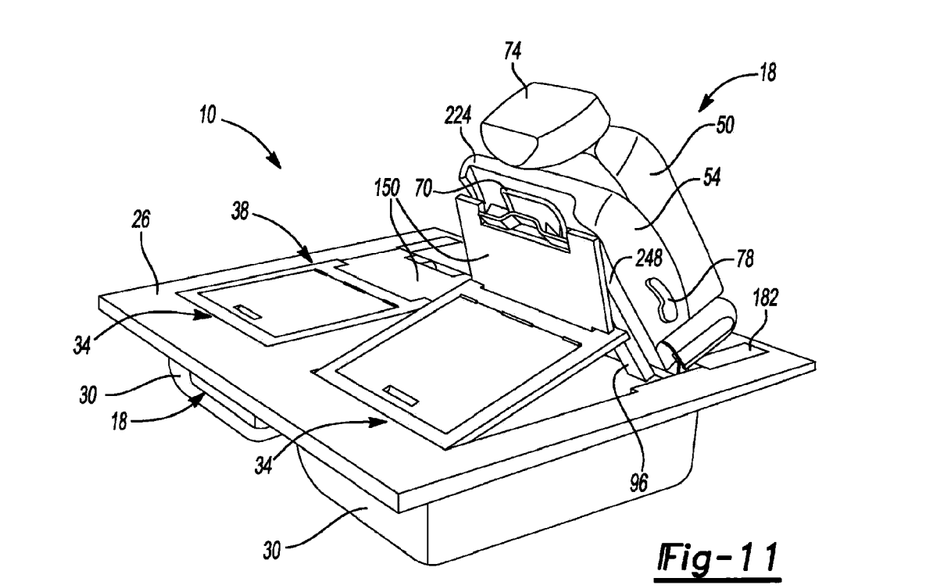
FIGS. 11 and 12 are perspective views depicting the stowable seat being moved/articulated toward a stowed position with the rollers advancing in the track arrangement according to the principles of the present disclosure.
Figure 12:
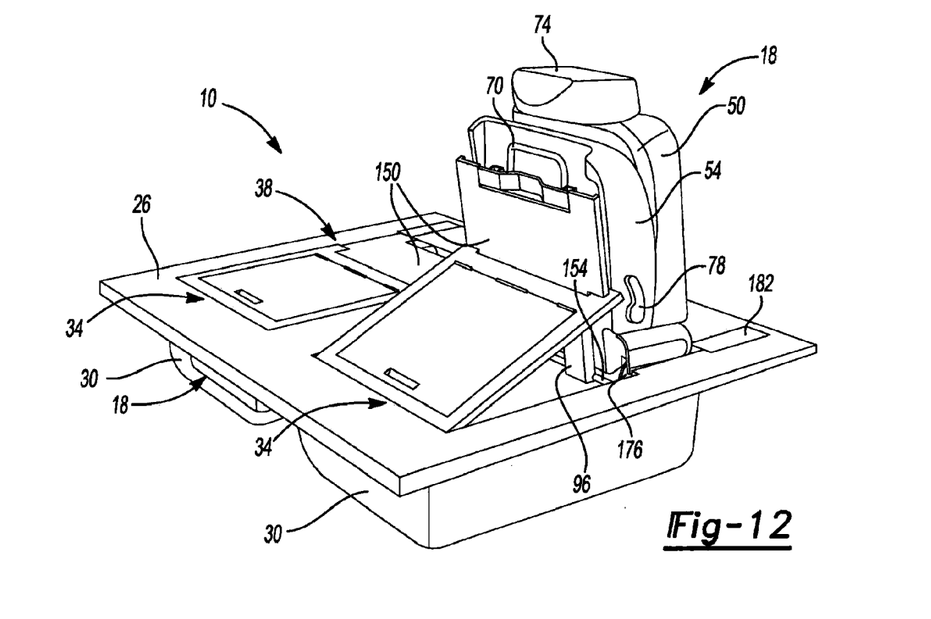
Figure 13A:
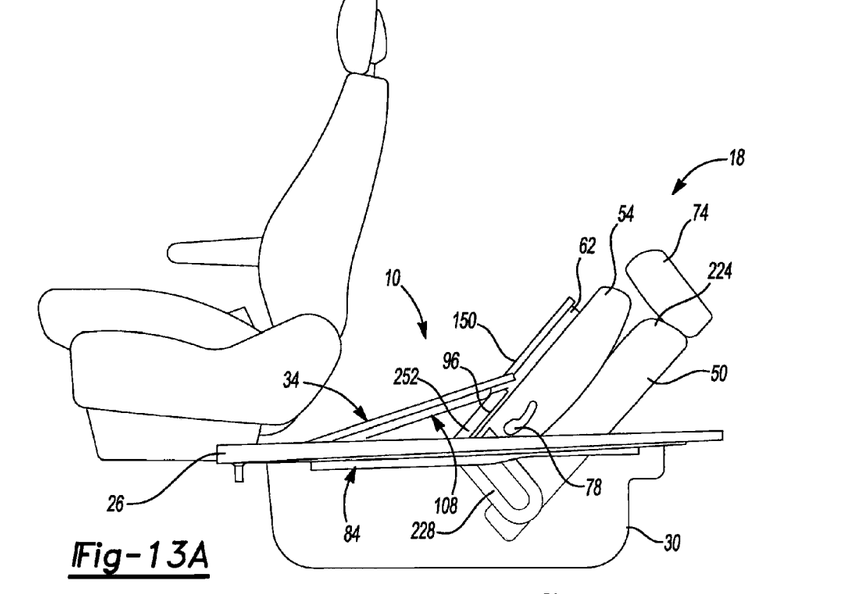
FIGS. 13A and 13B are side and perspective views depicting the stowable seat being moved/articulated toward a stowed position so that the seat back is positioned under the seat bottom according to the principles of the present disclosure.
Figure 13B:
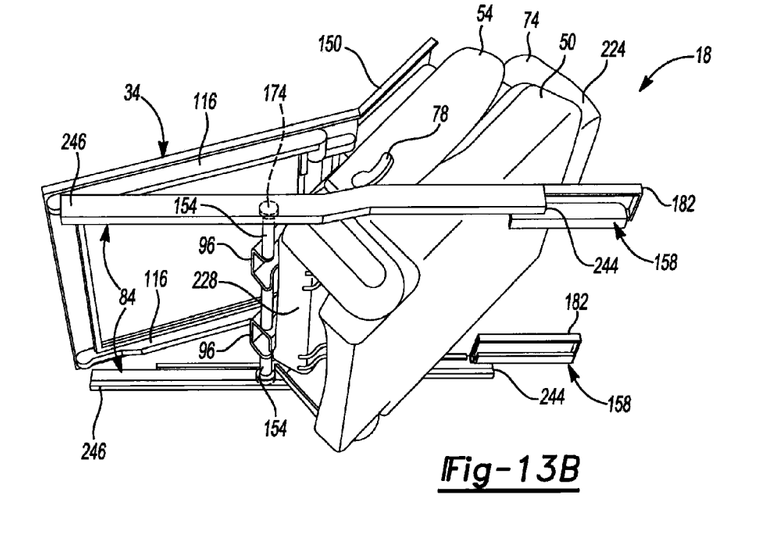

In this action, the rollers 174 are received in a receiving section 236 (FIG. 6A) of floor tracks 84 and the rearward end 228 of seat assembly 18 can now be guided by rollers 174 in tracks 84, as shown in FIGS. 10C and 11. Seat assembly 18 can be articulated about the pivotable connections 118, 142 and 146 (FIG. 7A), as well as guided by rollers 174 in floor tracks 84, such that the forward end 224 is urged rearward and the rearward end 228 is urged forward, as shown in FIGS. 12-13B. Continued articulation in this manner can transition the seat assembly 18 to a flipped over or inverted configuration where the seat bottom 54 is inverted and positioned above or on top of the seat back 50. For example, in the deployed configuration where seat back 50 is collapsed on seat bottom 54 shown in FIG. 5, seat back 50 is positioned on top of or above seat bottom 54. Conversely, when seat assembly 18 is stowed, as shown for example in FIGS. 15A-15B, seat assembly 18 is inverted such that seat bottom 54 is on top of or above seat back 50.

In transitioning to the inverted configuration, the rearward end 228 can travel via rollers 174 from a rearward end 244 of floor tracks 84 toward a forward end 246 of floor tracks 84. During this motion, the first floor panel 150 can contact or engage a first portion 248 of seat track assembly 58 such that the first floor panel 150 is parallel or substantially parallel to the seat track assembly 58, as shown in FIG. 12 with reference to FIG. 11. The telescoping sliding feature of the inner and outer tracks 92, 96 of track assembly 58 can facilitate the seat bottom 54 moving fore-aft relative to the access panel assembly 34. For example, in this portion of the stowage procedure, while the outer track 96 remains relatively stationary with the access panel assembly 34, the inner track 92 can move forward in the vehicle along with seat bottom 54 to facilitate stowing seat assembly 18, as generally shown in FIGS. 12-14B.

Figure 14A:
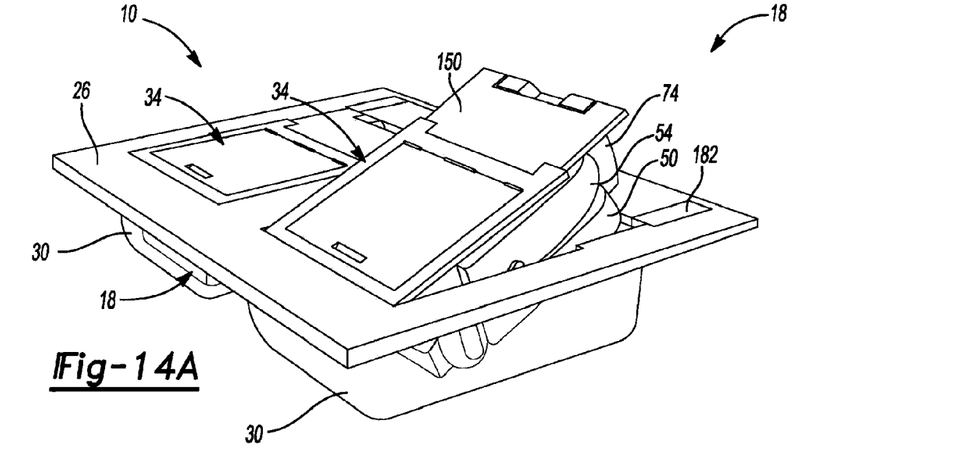
FIGS. 14A and 14B are side and perspective views depicting the stowable seat being moved/articulated toward a stowed position so that the seat back is positioned under the seat bottom according to the principles of the present disclosure.
Figure 14B:
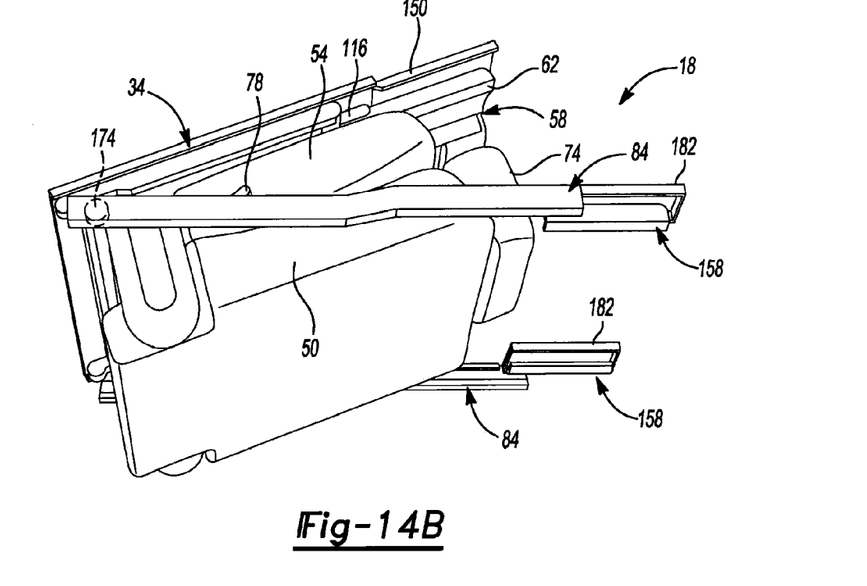

At this point in the stowage process, the front legs 62 can be substantially near or in contact with seat bottom 54 such that the seat track assembly 58 nests inside or between the front legs 62, as generally shown in FIG. 13A. Continued movement of the rearward end 228 of seat assembly 18 in a forward direction toward the forward end 246 of floor tracks 84 can bring access panel assembly 34 into engagement with a second portion 252 (FIG. 13A) of seat track assembly 58, as shown for example in FIGS. 14A-14B. In this position of the stowage procedure, the first floor panel 150 and the access panel assembly 34 can be coplanar to each other, as also shown in FIG. 14B. As shown in FIGS. 15A-15B, further movement of the rearward end 228 of seat assembly 18 along floor tracks 84 via rollers 174 in the forward direction of arrow A can position seat assembly 18 in the stowed position in the inverted configuration in stowage recess 30.

Figure 15A:
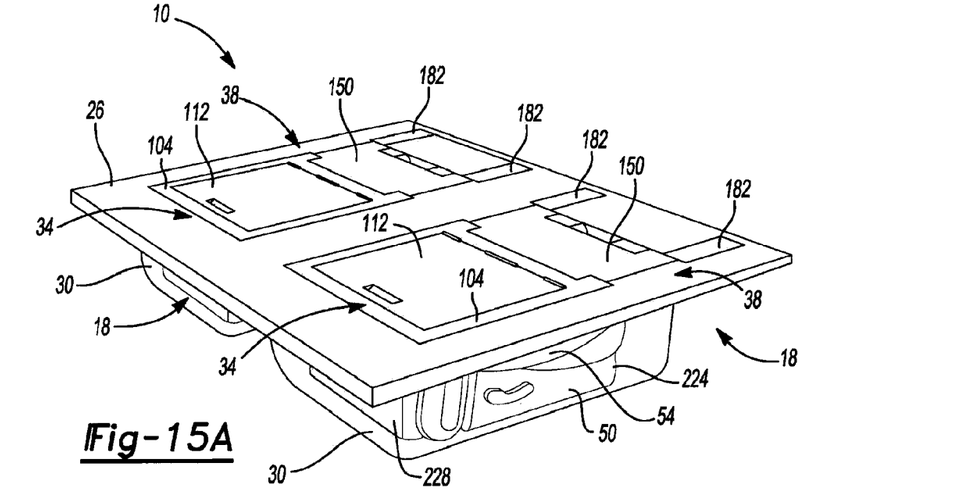
FIGS. 15A and 15B are top and bottom perspective views depicting the stowable seat in a stowed position according to the principles of the present disclosure.
Figure 15B:
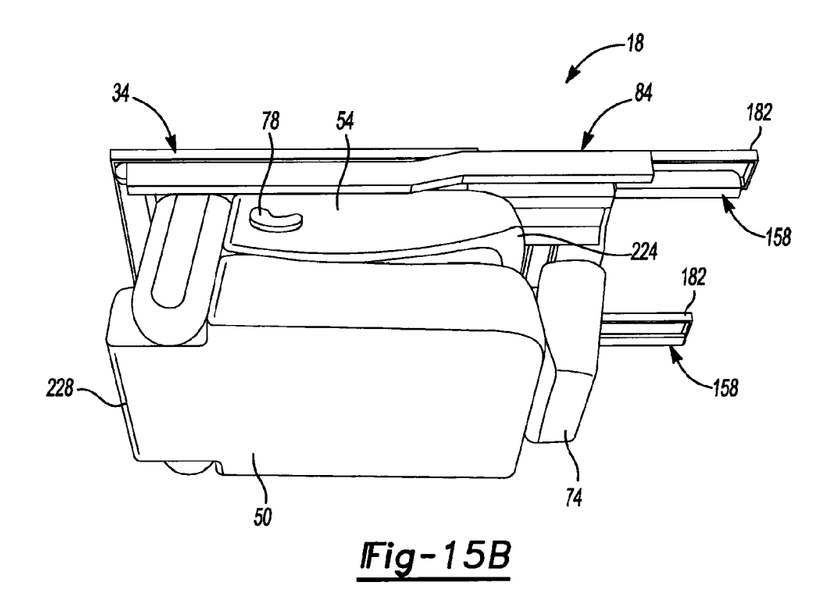

In the stowed position shown in FIGS. 15A-15B, the first floor panel 150 and the access panel assembly 34 can cooperate with vehicle floor 26 to form the flat load floor configuration 38. In this regard, as discussed above, the access panel assembly 34 and first floor panel 150 of seating arrangement 10 can automatically transition to be flush or substantially flush with vehicle floor 26 to form the flat load floor configuration 38 as seat assembly 18 is articulated from the deployed position (e.g., FIG. 4) to the stowed position (e.g., FIG. 15B). It should be appreciated that seat assembly 18 can be deployed from the stowed configuration to the deployed configuration by generally reversing the procedure discussed above for stowing seat assembly 18.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A stowable seat arrangement for a vehicle having a floor, comprising:
    a seat having a seat back pivotably coupled to a seat bottom;
    a pair of front legs and a pair of rear legs each pivotally coupled to the seat bottom;
    a first floor panel fixed to the pair of front legs and movable therewith;
    an access panel assembly pivotably coupled to the vehicle and the pair of front legs; and
    the seat configured to selectively articulate from a deployed position to a stowed position where the seat is adapted to be received in a stowage recess of the vehicle, the articulation of the seat from the deployed position to the stowed position configured to automatically open the access panel assembly to provide access to the stowage recess and then close the access panel assembly upon the seat being in the stowed position, the first floor panel being positioned substantially vertical to the vehicle floor when the seat is in the deployed position and configured to automatically move to a substantially horizontal position relative to the vehicle floor to provide a flat vehicle load floor configuration when the seat is in the stowed position.

2. The seat arrangement of claim 1, further comprising a pair telescoping seat track assemblies each having an inner track coupled to the seat bottom and an outer track selectively slidably coupled to the inner track, the outer tracks being pivotably coupled to the pair of front legs and the pair of rear legs.

3. The seat arrangement of claim 1, further comprising:
    a pair of floor tracks coupled to the vehicle; and
    a pair of rollers coupled to the seat bottom and operatively associated with the rear legs, the rollers being configured to engage the floor tracks during articulation of the seat from the deployed position to the stowed position.

4. The seat arrangement of claim 1, wherein the access panel assembly includes an outer access panel and an inner access panel, the outer access panel pivotably coupled to the pair of front legs at one end and pivotably coupled to the vehicle at an opposite end, the inner access panel pivotably coupled to the outer access panel at an end adjacent the pair of front legs and independently moveable relative to the outer access panel.

5. The seat arrangement of claim 4, wherein articulation of the seat from the deployed position toward the stowed position raises a forward end of the seat such that the pair of front legs raise from the vehicle floor and pivot the access panel assembly about the opposite end of the outer access panel coupled to the vehicle.

6. The seat arrangement of claim 4, wherein the outer access panel surrounds the inner access panel.

7. The seat arrangement of claim 1, wherein the pair of rear legs each further comprise:
    a first leg member coupled to the seat bottom;
    a second leg member pivotally releasably coupled to the first leg member at one end and coupled to the vehicle at an opposite end; and
    a roller coupled to the seat.

8. The seat arrangement of claim 7, further comprising a pair of floor tracks coupled to the vehicle, each floor track of the pair of floor tracks operatively associated with the roller of each of the pair of rear legs;
    wherein the rollers are configured to be spaced apart from the floor tracks when the seat is in the deployed position and configured to be received in the floor tracks when the second leg members of the pair of rear legs align with the pair of floor tracks during articulation from the deployed position of the seat to the stowed position of the seat.

9. The seat arrangement of claim 8, wherein the rollers are configured to engage the floor tracks at a first end of the floor tracks adjacent the rear legs and move along the floor tracks in a direction away from the second leg members as the seat articulates from the deployed position to the stowed position such that the seat bottom is inverted in the stowed position of the seat and positioned under the seat back.

10. The seat arrangement of claim 8, further comprising a second floor panel coupled to each of the second leg members, the second floor panels configured to be substantially flush with the vehicle floor and cover the respective second leg members when the second leg members are aligned with the floor tracks.

11. The seat arrangement of claim 10, wherein the first and second floor panels and the access panel assembly are configured to automatically move with the seat during articulation from the deployed position to the stowed position such that the first and second floor panels and the access panel assembly are in a substantially horizontal position relative to the vehicle floor to provide the flat vehicle load floor configuration when the seat is in the stowed position.

12. The seat arrangement of claim 8, wherein each first leg member of the pair of rear legs comprises shaft having a pair of opposed slots formed in an outer surface thereof; and
wherein each second leg member of the pair of rear legs comprises a channel formed at the one end and in communication with a shaft support region, the channel sized and shaped to permit the first leg member to slide out of the shaft support region when the pair of opposed slots are aligned with the channel and capture the shaft in the shaft support region when the pair of opposed slots are misaligned with the channel.

13. The seat arrangement of claim 12, wherein each roller is operatively associated with one of the first leg members such that the rollers are releasable from the second leg members and engage the floor tracks when the second leg members are aligned with the floor tracks and the pair of opposed slots of each first leg member is aligned with the channel of each second leg member.

14. A stowable seat arrangement for a vehicle having a floor, comprising:
a seat having a seat back pivotably coupled to a seat bottom;
a pair of seat tracks each having an inner track coupled to the seat bottom and an outer track selectively moveable relative to the inner track;
a pair of front legs pivotably coupled to the outer tracks;
a pair of rear legs, each rear leg including a first leg member coupled to the outer tracks and a second leg member releasably pivotably coupled at one end to the first leg member and pivotably coupled to the vehicle at a second end;
a roller operatively associated with each of the first leg members;
a pair of floor tracks coupled to the vehicle floor;
a first floor panel fixed to the pair of front legs and movable therewith; and
an access panel assembly pivotably coupled to the vehicle at a first end and to the pair of front legs and a second opposite end;
the seat configured to selectively articulate from a deployed position to a stowed position where the seat is adapted to be received in a stowage recess of the vehicle, the rollers configured to be received in the floor tracks and guided thereby during articulation of the seat from the deployed position to the stowed position;
the articulation of the seat from the deployed position to the stowed position configured to automatically open the access panel assembly to provide access to the stowage recess and then close the access panel assembly upon the seat being in the stowed position;
the first floor panel being positioned at an angle relative to the vehicle floor when the seat is in the deployed position and configured to automatically move to a substantially horizontal position relative to the vehicle floor to provide a flat vehicle load floor configuration along with the first floor panel when the seat is in the stowed position.

15. The seat arrangement of claim 14, wherein each second leg member comprises a second floor panel coupled thereto, the first floor panel, the second floor panel and the access panel assembly configured to automatically move during articulation of the seat to a substantially horizontal position relative to the vehicle floor to provide the flat vehicle load floor configuration when the seat is in the stowed position.

16. The seat arrangement of claim 14, wherein the pair of seat tracks nest between the pair of front legs when the seat is in the deployed position.

17. The seat arrangement of claim 14, wherein the access panel assembly includes an outer access panel and an inner access panel, the outer access panel pivotably coupled to the pair of front legs at one end and pivotably coupled to the vehicle at an opposite end, the inner access panel pivotably coupled to the outer access panel at an end adjacent the pair of front legs and independently moveably relative to the outer access panel.

18. The seat arrangement of claim 14, wherein each first leg member comprises shaft having a pair of opposed slots formed in an outer surface thereof at an end opposite an end coupled to the outer tracks; and
wherein each second leg member comprises a channel formed at the one end and in communication with a shaft support region, the channel sized and shaped to permit the first leg member to slide out of the shaft support region when the pair of opposed slots are aligned with the channel and to pivotably capture the shaft in the shaft support region when the pair of opposed slots are misaligned with the channel.

19. The seat arrangement of claim 18, wherein the second leg members are configured to align with floor tracks during articulation of the seat from the deployed position to the stowed position and, upon such alignment, the first leg members are configured to be released from the second leg members thereby releasing the rollers into the floor tracks.

20. The seat arrangement of claim 19, wherein the seat is configured to be guided by the rollers in the floor tracks to facilitate stowing the seat in the stowage recess in an inverted position where the seat back is positioned under the seat bottom.

* * * * *